P. A. FITZHUGH.
COTTON SEED DELINTER.
APPLICATION FILED OCT. 30, 1909.
979,066.
Patented Dec. 20, 1910.
3 SHEETS—SHEET 1.
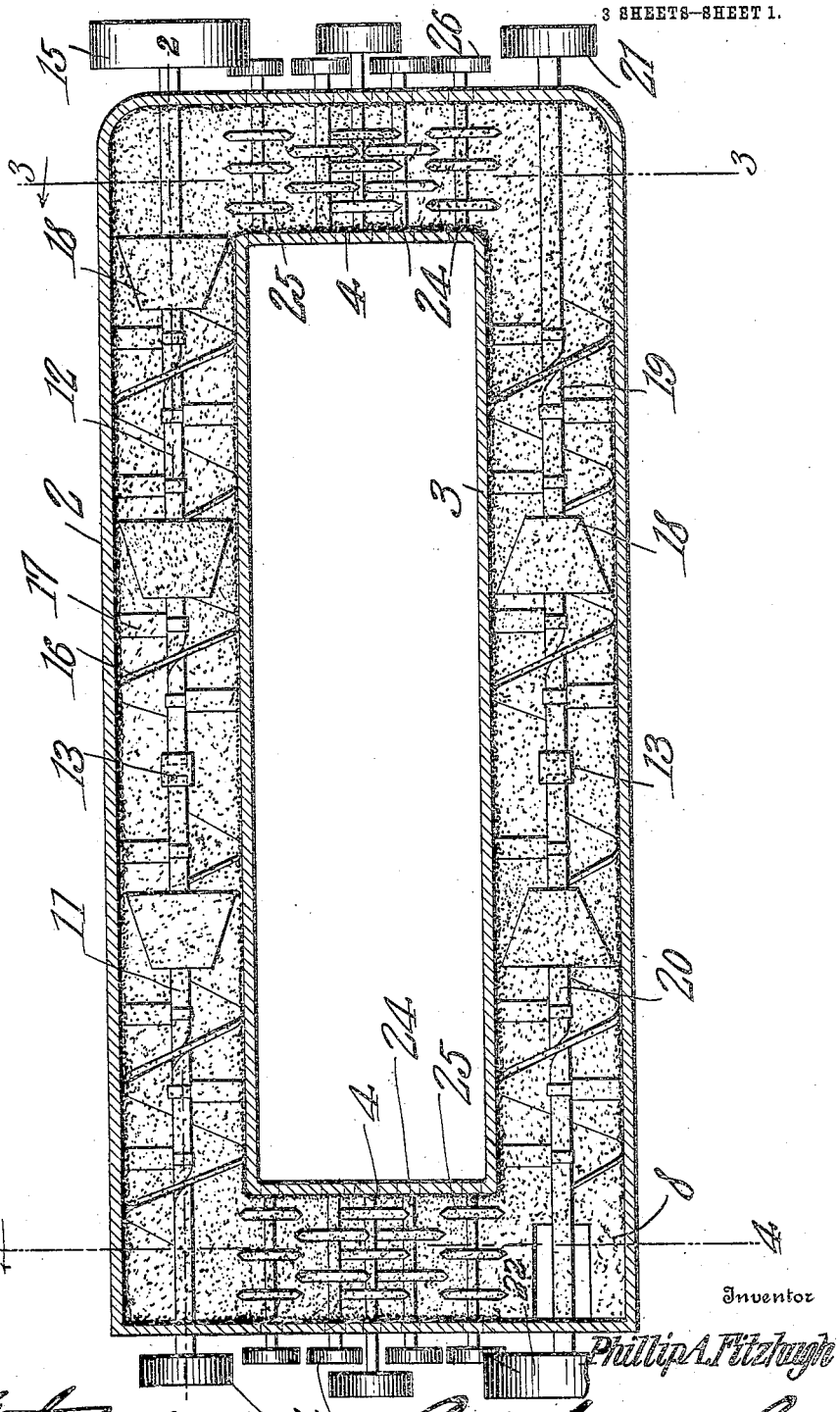

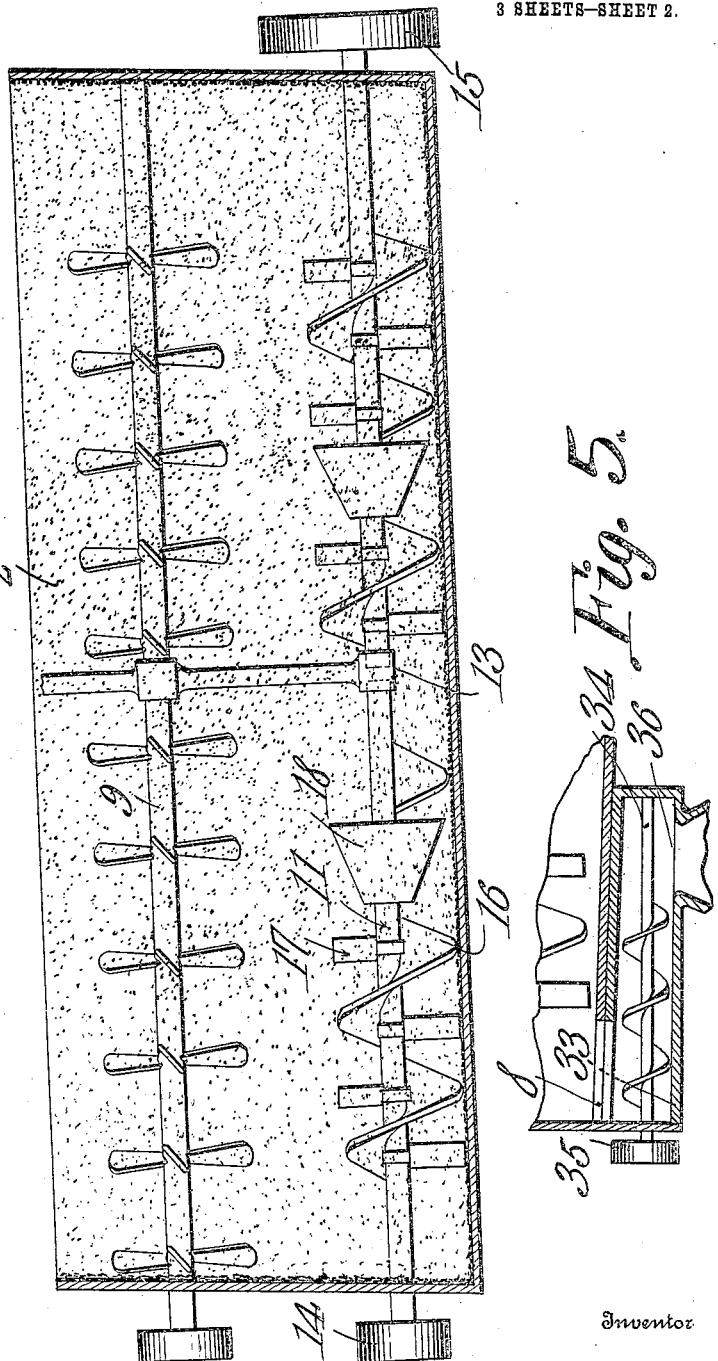

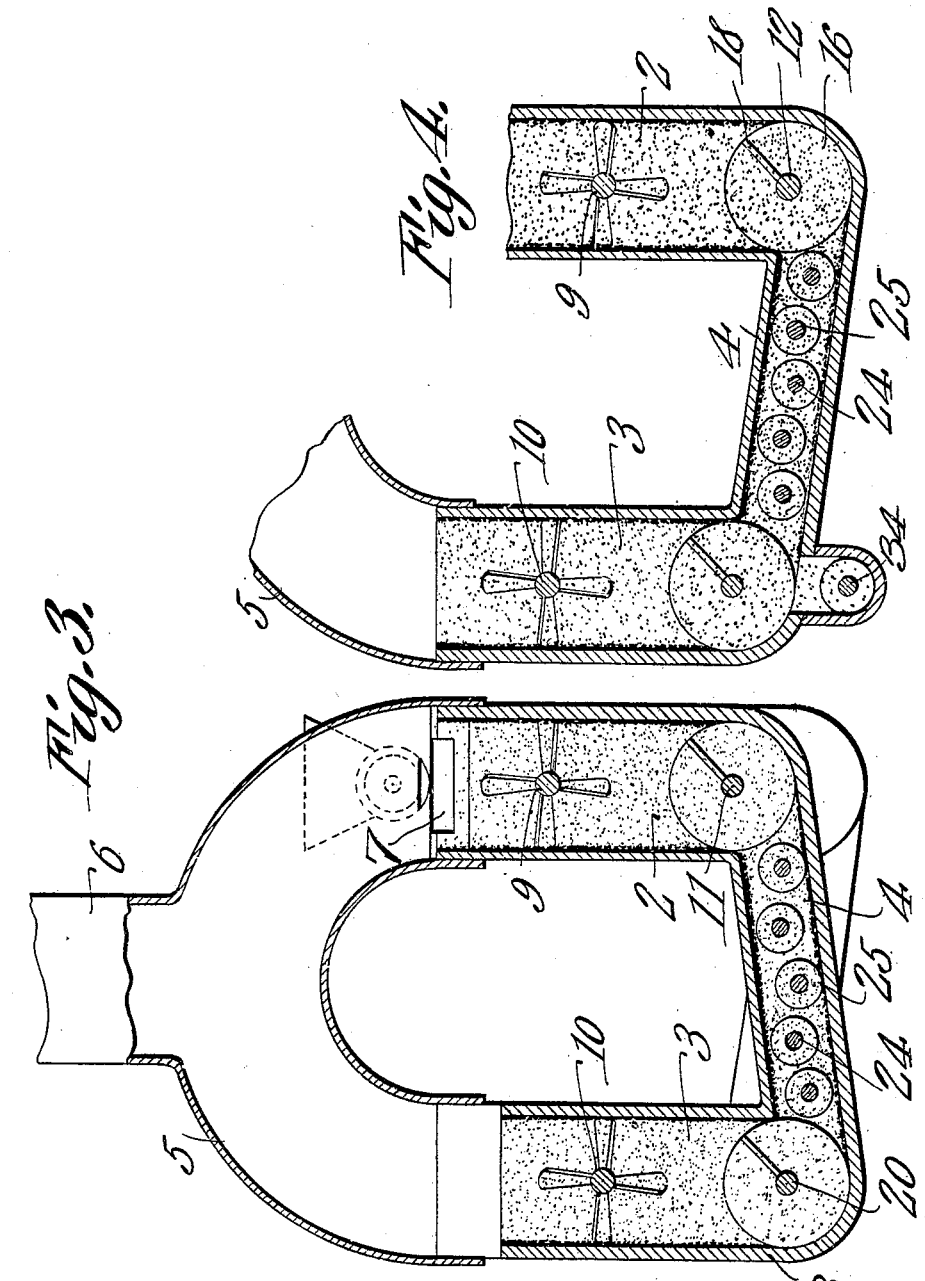

UNITED STATES PATENT OFFICE.

PHILLIP AYLETT FITZHUGH, OF GULFPORT, MISSISSIPPI.

COTTON-SEED DELINTER.

979,066.   Specification of Letters Patent.   Patented Dec. 20, 1910.

Application filed October 30, 1909. Serial No. 525,589.

*To all whom it may concern:*

Be it known that I, PHILLIP AYLETT FITZHUGH, a citizen of the United States, residing at Gulfport, in the county of Harrison and State of Mississippi, have invented a new and useful Cotton-Seed Delinter, of which the following is a specification.

This invention has relation to cotton seed and cotton seed hull delinters and consists in the novel construction and arrangement of its parts as hereinafter shown and described.

The object of the invention is to provide a simple and effective apparatus for removing lint from cotton seed and cotton seed hulls in such manner as to render the seed or hulls nude and thereby reduce to a minimum the possibility of danger from spontaneous combustion during transportation of the same, this will also make it possible to attain a better and more complete separation of the meat from the hulls and the lint, thereby increasing the yield of the meat and oil and at the same time improving the quality of all of the products obtained from the cotton seed.

In conjunction with the present invention means are provided for recovering the lint which may be used to advantage in the manufacture of paper and other commodities.

With the above objects in view the apparatus comprises troughs inclined in opposite directions and communicating one with the other, and a series of rotating abrading members are mounted in the passages which connect said troughs together. Worm augers are journaled for rotation in the said troughs and the said augers are made in sections which rotate at different rates of speed, the object of which will be hereinafter explained. Beaters are mounted upon the shafts of the said worm augers and retarders are also mounted upon the said shafts. Fans are journaled for rotation above the worm augers and a hood is located over the upper edges of the troughs and communicates with a suction draft means. Means are provided for feeding cotton seed or cotton seed hulls into the apparatus and also means are provided for removing the denuded seed or hulls therefrom.

In the accompanying drawings:—Figure 1 is a horizontal sectional view showing the lower portion of the apparatus. Fig. 2 is a longitudinal vertical sectional view of one of the troughs of the apparatus taken on the line 2—2 of Fig. 1. Fig. 2ª is a sectional view of a feeder used upon the apparatus. Fig. 3 is a transverse sectional view of the apparatus cut on the line 3—3 of Fig. 1. Fig. 4 is a transverse sectional view of the apparatus cut on the line 4—4 of Fig. 1. Fig. 5 is a longitudinal sectional view of the seed discharging mechanism.

The apparatus includes a trough 2 and a trough 3. The said troughs communicate with each other at both ends through passages 4. A hood 5 is located over the troughs and one end of a suction draft pipe 6 communicates with the said hood at a point approximately midway between the ends of the troughs 2 and 3. The hood is provided at a point over the lower end of the trough 2 with an inlet opening 7 and the bottom of the trough 3 is provided at its delivery or upper end with an outlet 8. The trough 2 slants in an upward direction from that end at which the inlet opening 7 is located and the trough 3 slopes upward toward that end thereof which is provided with the outlet 8. One of the passages 4 is downwardly inclined from the upper end of the trough 2 to the lower end of the trough 3 and the other passage 4 is inclined downwardly from the upper end of the trough 3 to the lower end of the trough 2. The shafts 9 and 10 are journaled for rotation above the bottom of the troughs 2 and 3 respectively and follow the general inclination of the troughs. The said shafts are provided with fan blades of usual pattern.

Auger sections 11 and 12 are journaled for rotation above the bottom of the trough 2 and are alined with each other and are pitched at the same angle as the bottom of the said trough. The adjacent ends of the said shaft sections are journaled in a bearing 13 and a relatively small pulley 14 is fixed to the protruding end of the shaft section 11 and a relatively large pulley 15 is fixed to the protruding end of the shaft section 12. The sections 11 and 12 carry worm blades 16 and beaters 17. Cone shaped retarders 18 are also mounted upon the shaft sections 11 and 12. The smaller ends of the conical retarders 18 are disposed in the direction from which the seed flows through the troughs 2 and 3, the object of which will be hereinafter explained. Shaft sections 19 and 20 are journaled for rotation in the trough 3 and are inclined in the direction opposite from that in which the shaft sections 11 and 12 are inclined. The adjacent ends of the shaft sections 19 and 20 are journaled in a bearing 13. The shaft section 19 is provided at its protruding end with a relatively small pulley 21 and the shaft section 20 is provided at its protruding end with a relatively large pulley 22. The shafts 24 are journaled for rotation and extend transversely across the passages 4. Disks 25 are fixed to the shafts 24. The shafts 24 are provided at their protruding ends with belt pulleys 26.

A cylinder 28 is located upon the hood 5 adjacent the inlet 7 and is slightly reduced in transverse area toward the opening 7 as at 29. The said cylinder 28 has an opening which registers with the opening 7 and at its opposite end a hopper 30 is mounted upon the said cylinder. A shaft 31 is journaled for rotation in the cylinder 28 and is provided with a worm auger 32 which terminates short of the reduced end portion 29 of the said cylinder 28. A cylinder 33 is located under the outlet opening at the end of the trough 3 and a shaft 34 is journaled for rotation in the said cylinder 33. The shaft 34 carries a worm auger similar to the auger 32 above described. A belt pulley 35 is fixed to the shaft 34 and one end of the cylinder 33 communicates with the opening 8 and the other end thereof is provided with a discharge outlet 36.

The shaft sections 19 and 20 are provided with worm augers, beaters and retarders similar to those hereinbefore described, and the said shaft sections, together with the beaters, worm augers and retarders and the sides of the troughs may entirely or in part be covered with an abrading material such for instance as emery which may be applied to the surfaces of the parts in form of paper or inlaid or as a powder as may be desired.

The operation of the delinter is as follows: Suction draft is created through the pipe 6 and at the same time seed or hulls bearing the lint are fed into the hopper 30. The said seed or hulls are advanced by the auger 32 until they arrive at the opening 7 in the hood 5. Through the said opening the said seed falls into the trough 2 and the volume of the seed in the casing 29 is sufficient to close the said casing so that suction draft through the same is prevented. The closing of said casing is rendered more effective by reason of the fact that the said casing is reduced toward that end which communicates with the opening 7 leading to the interior of the hood 5. The shaft sections 11 and 12, 19 and 20 and fan shafts 9 and 10 are maintained in a state of rotation and the shaft sections 11 and 19 rotate at a relatively rapid rate of speed while the sections 12 and 20 rotate at a relatively slow rate of speed. The seeds or hulls are engaged by the worm augers carried by the shaft sections 11 and 12 and that auger upon the shaft section 11 forces the seed promptly toward the auger upon the shaft section 12. By reason of the fact that the shaft section 12 rotates at a relatively slow rate of speed the seed is held back and also the retarders 18 serve as means for holding the seed back. Thus the peripheries of the seed are subjected to the abrading action of the material upon the surfaces of the sides of the trough and the worm augers, the beaters and retarders and the lint is separated from the pericarp of the seed. The separated lint is sucked up through the outlet pipe 6 and may be reclaimed while the seed passes up the trough 2 and thence down through one of the passages 4 and is subjected to the abrading action of the disks 25 and enters the trough 3. Throughout the length of the trough 3 the seed is subjected to a similar abrading on the part of the rotating members and when it is finally delivered through the opening 8 into the casing 33 it is denuded. As the seed is delivered to the casing 33 it collects therein and is crowded through the said casing by the action of the auger upon the shaft 34. Thus the seed fills the casing 33 and prevents a suction draft from passing up through the said casing. Therefore it will be seen that a simple and effective apparatus is provided for removing the lint from cotton seed and that the seed when delivered from the machine is in an advantageous condition for commercial and manufacturing purposes, also the removed lint may be recovered to be used for commercial purposes. When the seeds are engaged by the beaters 17 they are agitated in the troughs and turned so that all of their sides are presented to the abrading action of the surfaces provided with the emery or like material as stated. Also by reason of the fact that the fan blades carried by the shafts 9 and 10 are covered with emery should the seed fly into contact with the said blades it is subjected to an abrading action as indicated. In case the seed should not be thoroughly delinted by being passed once along the troughs 2 and 3 they may be passed through the said troughs a number of times for the purpose of removing the lint. This can be done by causing the worm auger in the cylinder 33 to remain at rest and thus the seed previously deposited in the cylinder 33 will remain therein and close the said cylinder and when the seed passing through the trough 3 arrives at the outlet 8 they will pass through the adjacent passage 4 and enter the lower end of the trough 2 and will be passed again through the same.

Having described my invention, what I claim as new and desire to secure by Letters Patent is:—

1. A cotton seed delinter comprising inclined troughs arranged so as to communicate at both ends one with the other, a feeding device located over the lower end portion of one trough, a discharging device located under the upper end portion of the other trough, and means located in the troughs for passing cotton seed along the same and subjecting the seed to abrading action.

2. A cotton seed delinter comprising an inclined trough, shaft sections journaled for rotation in the trough and alined with each other, means to rotate the alined shaft sections at different rates of speed, conveying means carried by the shaft sections, and seed abraders located upon the shaft sections.

3. A cotton seed delinter comprising troughs inclined in opposite directions and communicating with each other, seed conveying means located in the troughs and adapted to submit the seed to abrading action, a hood located over the troughs, a suction pipe connected with the hood, said hood having an inlet opening, a casing located over said opening and communicating with the interior of the hood through the opening, a hopper located at one end of the casing, the other end of the casing being reduced in transverse dimension, a worm auger located in said casing and adapted to convey material from the hopper to the inlet opening of the hood, one of said troughs having an outlet opening, a casing located under said outlet opening, a worm auger journaled for rotation in the last said casing and adapted to transmit seed from the outlet opening and fans journaled for rotation in the troughs above the seed conveying means.

In testimony that I claim the foregoing as my own, I have hereto affixed my signature in the presence of two witnesses.

PHILLIP AYLETT FITZHUGH.

Witnesses:
   Thos. P. Hale,
   E. E. Beogau.